US012278792B2

(12) United States Patent
Gervais et al.

(10) Patent No.: US 12,278,792 B2
(45) Date of Patent: Apr. 15, 2025

(54) COLLABORATIVE VIDEO MESSAGING COMPONENT

(71) Applicant: Microsoft Technology Licensing, LLC, Redmond, WA (US)

(72) Inventors: Constance Gervais, Seattle, WA (US); Bryan Joseph Heredia, Vancouver (CA); Flavio Ander Andrade, Quincy, MA (US); Xiaoyang Wu, Alpharetta, GA (US); Kejia Xu, Burnaby (CA); Ji-Yeon Kim, Vancouver (CA); Alyssa Ann Dunn, Vancouver (CA); Cindy Shao-Yu Hsu Tan, Coquitlam (CA); Edward Zhen Yu Chen, Richmond (CA); Shannon Yen Yun Lee, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 144 days.

(21) Appl. No.: 17/994,962

(22) Filed: Nov. 28, 2022

(65) Prior Publication Data

US 2024/0179112 A1    May 30, 2024

(51) Int. Cl.
*G06F 3/048* (2013.01)
*G06F 3/0482* (2013.01)
*H04L 51/10* (2022.01)

(52) U.S. Cl.
CPC ............ *H04L 51/10* (2013.01); *G06F 3/0482* (2013.01)

(58) Field of Classification Search
CPC ...................................................... H04L 51/10
See application file for complete search history.

(56) References Cited

U.S. PATENT DOCUMENTS

| 2014/0188997 A1* | 7/2014 | Schneiderman | ........ H04L 51/52 709/204 |
| 2015/0381403 A1* | 12/2015 | Venaglia | ................. H04W 4/21 709/220 |
| 2019/0342241 A1* | 11/2019 | Joyce | ................... H04N 21/632 |

FOREIGN PATENT DOCUMENTS

WO    2016007374 A1    1/2016

OTHER PUBLICATIONS

International Search Report and Written Opinion received for PCT Application No. PCT/US2023/034498, mailed on Feb. 1, 2024, 12 pages.

\* cited by examiner

Primary Examiner — Claudia Dragoescu
(74) Attorney, Agent, or Firm — NovoTechIP International PLLC

(57) ABSTRACT

Video messaging systems and methods utilize a video messaging component based on a video messaging component container stored in a data store. The video messaging component container includes a collaborative video list that shows a list of video content generated by users of the video messaging component. Iterations of the video messaging component are rendered in host applications on client devices. As video content is generated by the iterations, the collaborative video list is updated to include the video content, and the iterations of the video messaging component are updated to reflect changes to the collaborative video list in real-time.

10 Claims, 8 Drawing Sheets

COLLABORATIVE VIDEO MESSAGING COMPONENT

BACKGROUND

Real-time video communications services, such as real-time video calling services, are increasingly being used for interpersonal communications. Such real-time video communications services require that each person be available at the same time in order to participate in the video communication session. However, it can be difficult at times for people to synchronize their availability to have a video communication session. This is only exacerbated when trying to get more than two people available for a video communication session at the same time.

Users have leveraged other traditional communication services to send and receive video content. For example, a user may attach a video file to an email message, text message, or digital message board post. However, in such uses of communication services, text rather than video is typically the primary medium or basis of interpersonal communications between users of the services. Such traditional communications services are not well-suited and/or not tailored to video communications. Moreover, traditional communications services that are used to send and receive video as attachments lack capabilities, features, and/or user interfaces for producing quality user experiences related to creating, viewing, and/or otherwise processing the video attachments.

Video sharing services allow users of the services to share videos with other users of the services. For example, a user may upload a video to a video sharing service such as YouTube. Once the video has been uploaded, other users of the video sharing service may access and view the video. However, in such video sharing services, videos are not threaded for interpersonal communications, and for at least this reason, such video sharing services do not provide true interpersonal communication threads or experiences for users. For example, such video sharing services do not support interpersonal communications in a way that would allow users to create and participate in a directed, back-and-forth video conversation. In addition, existing video sharing services lack capabilities, features, and/or user interfaces for producing quality user experiences related to creating, viewing, and/or otherwise processing shared video content in the context of an interpersonal video communication thread.

What is needed therefore are systems and methods for facilitating asynchronous, video-based conversations that does not require each person to be available at the same time and that does not require separate applications for generating and then sharing video content with other users.

SUMMARY

In yet another general aspect, the instant disclosure presents a method for asynchronous video messaging. The method includes rendering iterations of a first video messaging component in host applications on client devices and linking the iterations to a first video messaging component file stored in a shared storage, the first video messaging component file including a collaborative video list for collecting and storing playback information and display information for video content generated by the iterations of the video messaging component, each of the iterations having a user interface, the user interface including (i) a video list interface for showing the display information for the video content, (ii) a video display interface for playing the video content based on the playback information, and (iii) a video generating interface for generating the video content for the collaborative video list; generating new video content for the first video messaging component via the video generating interface of one or more of the iterations of the video messaging component; storing new playback information and new display information for the new video content in the collaborative video list; and updating the video list interface of each of the iterations of the video messaging component to reflect changes to the collaborative video list of the first video messaging component file in real-time.

In one general aspect, the instant disclosure presents a data processing system having a processor and a memory in communication with the processor wherein the memory stores executable instructions that, when executed by the processor, cause the data processing system to perform multiple functions. The function may include rendering a first iteration of a first video messaging component in a first host application and linking the first iteration to a first video messaging component file stored in a shared storage, the first video messaging component file including a first collaborative video list for collecting and storing playback information for video content generated for the first video messaging component, the first iteration having a user interface, the user interface including (i) a video list interface for showing the video content in the first collaborative video list, (ii) a video display interface for playing the video content in the video list interface, and (iii) a video generating interface for generating new video content for the first video messaging component. The video list interface of the first iteration of the video messaging component is then updated to reflect changes to the first collaborative video list of the first video messaging component file in real-time.

In a further general aspect, the instant application describes a non-transitory computer readable medium on which are stored instructions that when executed cause a programmable device to perform functions of rendering a first iteration of a first video messaging component in a first host application and linking the first iteration to a first video messaging component file stored in a shared storage, the first video messaging component file including a first collaborative video list for collecting and storing playback information for video content generated for the first video messaging component, the first iteration having a user interface, the user interface including (i) a video list interface for showing the video content in the first collaborative video list, (ii) a video display interface for playing the video content in the video list interface, and (iii) a video generating interface for generating new video content for the first video messaging component; and updating the video list interface of the first iteration of the video messaging component to reflect changes to the first collaborative video list of the first video messaging component file in real-time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example

DETAILED DESCRIPTION

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Figure 1:
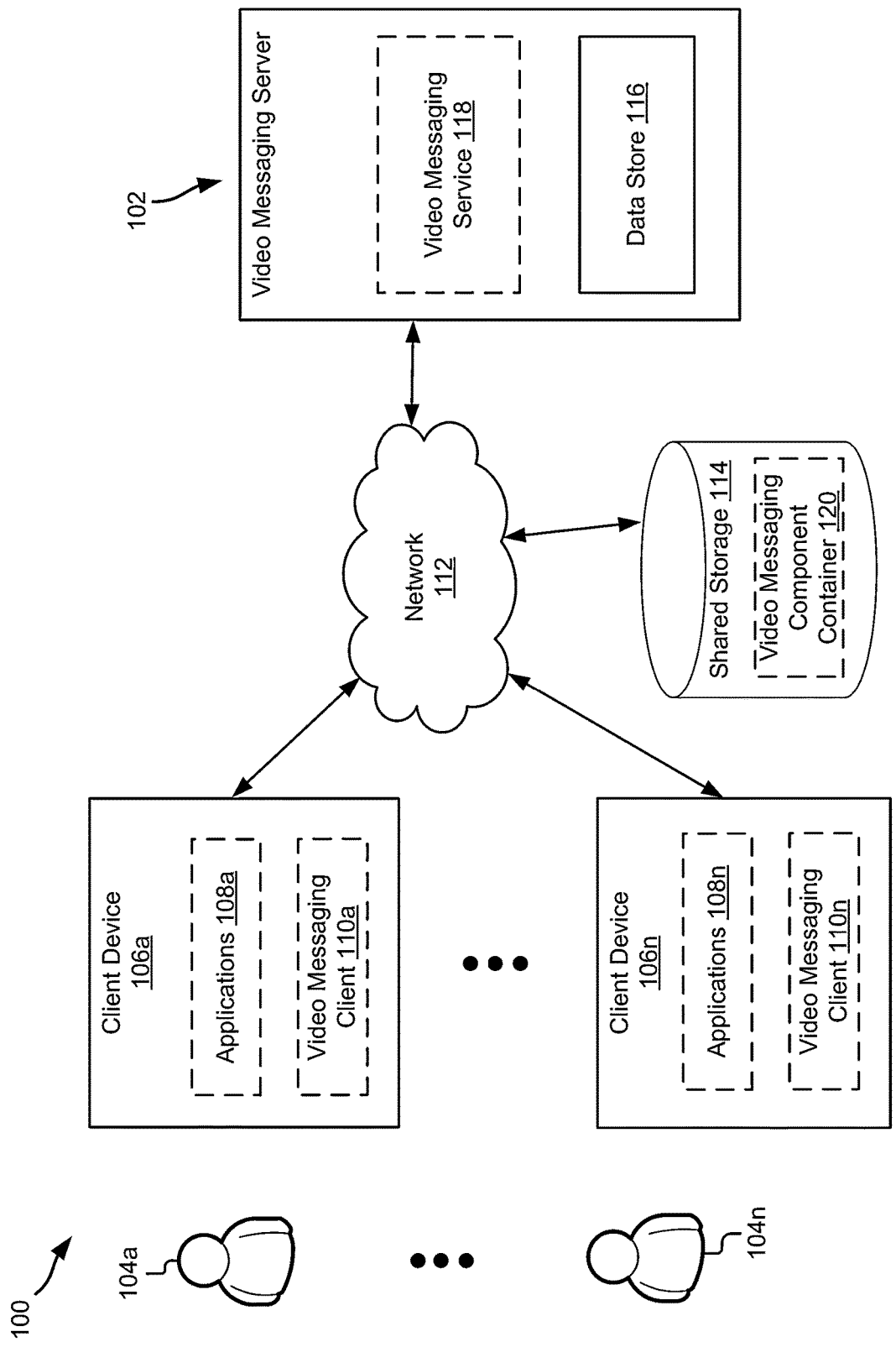
FIG. 1 depicts an example system upon which aspects of this disclosure may be implemented.

FIG. 1 Depicts an Example System Upon which Aspects of this Disclosure May be Implemented.

As noted above, current video-based communication systems typically require that each person that is to be a party to a video-based conversation be available at the same time to have the conversation. Text-based communications, such as email and text messaging, has enabled asynchronous communications between people, i.e. communication that does not require that each person be available at the same time. However, compared to face-to-face conversations, text-based communication is limited in its ability to convey information due to the lack of non-verbal cues, such as gestures, facial expressions, and the like, that can add meaning and clarification to what is being said.

Text-based communication systems have allowed users to send and receive video content. For example, a user may attach a video file to an email message, text message, or digital message board post. However, a separate application is typically required to generate the video that is to be sent/attached. As a result, a user has to navigate through different interfaces of different applications to generate the video, save the video, find the video, and attach the video to a message. This can be time consuming and, in some cases, frustrating for users. Video sharing services enable users to generate and upload video content. However, such video sharing services do not support interpersonal communications in a way that would allow users to create and participate in a directed, back-and-forth video conversation.

To address these technical problems and more, in an example, this description provides technical solutions in the form of a video messaging system based on collaborative video messaging components. A video messaging component may be rendered inline in a host application, such as an email application, chat application, meeting application, word processing application, and the like, and shared with other users to enable an asynchronous video messaging conversation. The term "inline" refers to the incorporation and/or placement of the video messaging component in the interface of a host application as a content portion which may be among other content portions, e.g., text, images, other interface elements, etc. in the host application. A video messaging component includes the functionality for viewing video content from other users as well as generating video content for distribution to other users of the video messaging component. As used herein, the term "generating" can mean both the creation of new video content as well as adding new video content such as by uploading video content.

The video messaging component is implemented using a video messaging client that includes instructions/code for creating and rendering a user interface for the video messaging component in host applications on a client device. When a video messaging component is created, a video messaging component file, referred to herein as a "video messaging component container" or simply "container," is created and stored in a memory, or data store. The video messaging component container includes a shared data structure in the form of a collaborative video list for collecting and storing playback information for video content created/added to the video messaging component. The video messaging component includes functionality for displaying a list of the video content added to the video messaging component container, playing the video content based on the playback information in the collaborative video list, and adding new video content to the collaborative video list. Access to a video messaging component may be shared with other users, e.g., by adding the video messaging component, or a link to the video messaging component to an email, a message, a collaborative document, and the like. Each user having access to the video messaging component container can generate an iteration of the video messaging component in a host application on a client device. The iterations of a video messaging component can each add video content for viewing on other iterations of the video messaging component and view video content generated on other iterations of the video messaging component.

The collaborative video list is updated in real-time as video content is being rendered, and the updates to the collaborative video list are reflected in the iterations of the video messaging component in real-time. To this end, the video messaging system may be implemented at least in part using a collaborative framework, such as MICROSOFT® FLUID® framework, that includes a collection of client libraries for distributing and synchronizing state for shared data, such as the collaborative video list. For example, the client libraries may allow multiple collaborative clients, such as the video messaging clients, to access and update shared data in a manner similar to methods used for accessing and updating local data. This in turn enables the updates to be shared and rendered in real-time and in chronological order in all of the iterations of the video messaging client.

The technical solutions described herein address the technical problem associated with enabling video-based, asynchronous communication systems. The technical solutions provide the ability to generate and view video messages in the same interface. In addition, video messages are added to the video list for the component in real-time as the video messages are being generated by other users. This enhances the ability of video messaging to serve as an improved asynchronous communication method relative to text-based and audio-based messaging systems. For example, video messaging enables facial expressions, gestures, and other visual, non-verbal cues to be seen which can help convey meaning regarding what is being said that would otherwise not be possible with text-based and audio-based messaging.

FIG. 1 illustrates an example system 100 for implementing a collaborative video messaging system in accordance with this disclosure. The system 100 includes client devices 106a-106n, data store 114, and a server 102 which are connected by a communication network 112. The communication network 112 may be a wide area network (WAN) such as the Internet, a local area network (LAN), or any other suitable type of communication network. In some embodiments, the communication network 112 may be a single communication network or may be made up of multiple different communication networks.

Client devices 106a-106n can be one of various types of computing devices, such as tablet computing devices, desktop computers, mobile communication devices, laptop computers, laptop/tablet hybrid computing devices, large screen multi-touch displays, vehicle computing systems, gaming devices, smart televisions, wearable devices, internet of things (IoT) devices, etc. Client devices 106a-106n include one or more applications 108a-108n which may be executed on client devices 106a-106n to perform various tasks. The applications 108a-108n may include email applications, chat applications, meeting applications, instant messengers, and the like, and/or may include other suitable types of applications, such as word processing applications, spreadsheet applications, notebook applications, and the like. The applications 108a-108n may be locally installed on a client device and/or may be web-based applications that are accessible using a web browser or other application capable of accessing web-based services.

The data store 114 includes one or more shared memory devices that are accessible to the client devices, and in particular, to the applications on the client devices. Any suitable type of memory/storage may be utilized. In embodiments, the data store 114 may be an online storage system which is accessible to the client devices 106a-106n via the network 112. In some embodiments, the data store 114 may include a local memory of one or more client devices 106a-106n that is shared and accessible to other devices via the network 112. Non-limiting examples of data store 114 include Microsoft™ SharePoint™, Microsoft™ OneDrive™, Google™ Drive™ and DropBox™.

Client devices 106a-106n include video messaging clients 110a-110n for enabling users 104a-104n to access and utilize a video messaging system. The video messaging clients 110a-110n include the functionality for generating video messaging components in host applications on the client devices. In embodiments, the video messaging client 110a-110n may be installed on the client device 106a-106n as a plug-in or add-on to one or more of the applications 108a-108n and/or may be embedded in or may operate as a plug-in or add-on to a web browser. In embodiments, video messaging client enables host applications to provide user selectable options for creating new video messaging components inline in the application. When a user selects an option to add a new video messaging component inline in a host application, the video messaging client generates a new video messaging component in the host application and creates a new video messaging component container 120 in the data store 114 including a collaborative video list for collecting the playback information for video content generated by the video messaging component.

The video messaging component container comprises a shared data structure, such as a distributed data structure, for implementing a collaborative video list for storing video content data, such as playback information, display information (e.g., thumbnails), sequence information, and the like, pertaining to the video content generated by users of the video messaging component. When new video content is generated by a user in one iteration of a video messaging component, the collaborative video list in the video messaging component container is updated to include information pertaining to the new video content. The collaborative video list enables new video content to be listed in real-time in all of the iterations of the video messaging component. The video messaging container includes code, instructions, functions and the like that define the interactions Video messaging server 102 is configured to provide a video messaging service 118 for the video messaging system. In embodiments, video messaging service 118 may include video storage and playback services. The video content generated by users of iterations of a video messaging component may be uploaded to the video messaging server 102 by video messaging clients 110a-110n. The video messaging server 102 may store the uploaded video content in a data store 116 and/or in the data store 114 and provide playback information and display information to the video messaging clients 110a-110n. The playback information includes information needed to request playback of a given video, such as a link or address (e.g., a uniform resource locator (URL). The display information includes a thumbnail for the video, or other type of visual representation, that may be displayed in video messaging components to represent the video content as well as text, such as username, time the video was uploaded, video length, etc.

The playback information and display information for video content is added to the collaborative video list of the video messaging component container 120 by the video messaging clients and/or by the video messaging server, and in real-time as video content is being generated by the iterations of the video messaging component. To this end, the video messaging component container, the video messaging client, and video messaging service may be implemented using a collaborative framework, such as MICROSOFT® FLUID® framework, that includes a collection of client libraries for distributing and synchronizing state for shared data, such as the collaborative video list. For example, the client libraries may allow multiple collaborative clients, such as the video messaging clients, to access and update shared data in a manner similar to methods used for accessing and updating local data. This in turn enables the updates to the shared data to be shared and reflected in iterations a collaborative canvas component essentially in real-time.

As noted above, the ability to reflect additions to the video content of a video messaging component in real-time enhances the ability of video messaging to serve as a communication medium between users and offers improvements in communication relative to text-based and audio-based messaging systems. Video messaging enables facial expressions, gestures, and other visual, non-verbal cues to be seen which can help convey meaning regarding what is being said. Text-based and audio-based systems are not able to provide these benefits.

Figure 2:
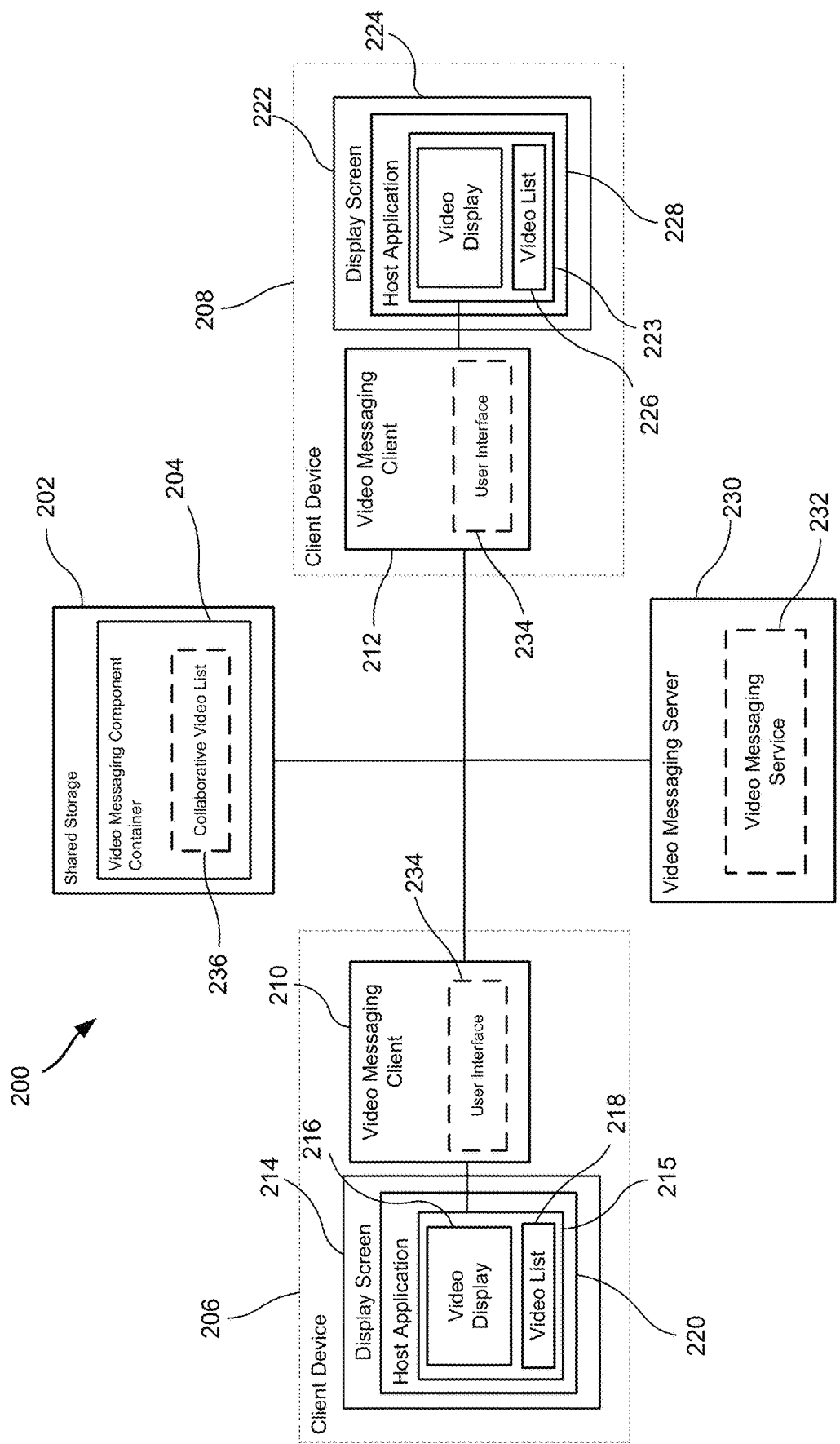
FIG. 2 depicts an example implementation of video messaging system in accordance with this disclosure that may be utilized in the system of FIG. 1.

FIG. 2 shows an example implementation of a video messaging system 200 in greater detail. The client devices 206, 208 each include a respective host application 220, 228 and a respective video messaging client 210, 212. The host application 220, 228 may include an email application, chat application, meeting application, word processing application, spreadsheet application, notebook application, web browser or the like. Video messaging clients 210, 212 may be provided as a plug-in or add-on to the respective host application 220, 228. The video messaging client 210, 212 includes and/or has access to the instructions/code for generating a user interface 234 for a video messaging component in the host application. In embodiments, the video messaging client 210, 212 may enable a host application to provide users with a selectable option via a user interface of the host application for adding a video messaging component inline in the host application. In the embodiment of FIG. 2, a user of the first client device 206 has requested a new video messaging component to be created in the host application 220. The video messaging client 210 for the host application generates the video messaging component 215 including the user interface 234 and creates a new video messaging component container 204 in the data store 202 that is linked to the video messaging component 215. The video messaging component container 204 includes a collaborative video list 236 for collecting and storing playback information for the video messaging component 215.

In embodiments, creating a video messaging component includes creating a video messaging component container in the data store. The video messaging component container may be created based on a template which defines the code, instructions, files, media content and the like for generating a new video messaging component container in a data store. Once the new video messaging component container has been created in the data store, the video messaging client receives the linking parameters for linking to the new video messaging component to the new video messaging component container. The linking parameters may include, for example, one or more of: (i) an identifier for the user creating the new video messaging component, (ii) an identifier for the new video messaging component and/or video messaging component container (e.g., a file name), (iii) an address for the video messaging component in the data store, and (iv) any other information that may be used and/or required to identify/access the video messaging component container.

In some embodiments, the video messaging component container 204 may include the code, instructions, and other information and/or may point to the location of the code, instructions and other information for generating and rendering the user interface 234 of the video messaging component in the host application. In other embodiments, the instructions/code for generating the user interface 234 may be stored locally, e.g., in the client device, stored in the data store, downloaded from an online source, such as a server. Once a new video messaging component container has been created, the video messaging client may obtain the code/ instructions for rendering the new video messaging component in the host application and obtain the linking parameters for linking the new video messaging component to the new video messaging component container in the data store. In embodiments, a collaborative video list for a video messaging component may be populated with initial/default video content (e.g., introductory videos, tutorial videos, and the like) in which case, once the new video messaging component is linked to the new video messaging component container, the content of the collaborative video list is retrieved and displayed in the user interface for the new video messaging component.

In embodiments, the video messaging client may be configured to enable users to select previously created video messaging components for insertion into a host application. For example, the video messaging client may be configured to identify video messaging components that have been previously created by a user and to provide the user with selectable options for incorporating one or more of these previously created video messaging components into the host application. Similar to creating a new video messaging component, inserting a previously known video messaging component into a host application includes rendering the user interface for the video messaging component in the host application, obtaining the linking parameters for the video messaging component container associated with the video messaging component the user wishes to insert into the application, linking the video messaging component container to the video messaging component, and retrieving the content from the collaborative video list for the video messaging component container.

Access to the video messaging component container 204 may be shared with other users, such as a user of the second client device 208, in a number of ways. As one example, a user of the first client device 206 may incorporate a video messaging component into a message, such as an email message, a chat message, or the like, that is sent to the user of the second client device 208. The video messaging client 212 can then render the same video messaging component 223 in the corresponding host application 228 which receives the message and provide access to the linked video messaging component container 204 in the data store 202. In embodiments, this access may be provided automatically. In embodiments, the video messaging client 210, 212 may enable the video messaging component to be copied from one location to another within a host application and/or from one host application to another host application (e.g., from an email application to a word processing application) such that multiple iterations of the same video messaging component may be provided on the same device which are all linked to the video messaging component container 204. In embodiments, a video messaging component may be shared by embedding or encoding a link in a user interface of a host application that includes the linking parameters for the video messaging component container 204 in the data store 114. For example, the linking parameters may be encoded into, or included in, a link (e.g., a URL) that may be embedded into a message, e.g., an email, text message, chat message, or the like, that can be sent to one or more recipients and displayed in a corresponding host application on the recipients' devices. The recipients then have access to the same video messaging component and can view and/or generate video content for the component.

The video messaging component container is configured to enable the functionality that allows iterations of the video messaging component to interact with the collaborative video list. For example, the video messaging component container may be configured to implement an application programming interface (API) that enables clients to retrieve and update the content of the collaborative video list as well as enable video messaging components to interact with the videos (e.g., play, pause, fast forward, rewind) in the collaborative video list.

In the example of FIG. 2, the user interface 234 for the video messaging component rendered on the first and second client devices includes a video list interface 218, 226 and a video display interface 216, 224. The video list interface 218, 226 shows the list of videos in the collaborative video list 236. Video content generated by the first user and the second user via the iterations 215, 223 of the video messaging component is uploaded to the server 230. The server 230 returns playback information and display information for each video which is added to the collaborative video list 236 of the video messaging component container 204. The changes to the collaborative video list 236 are reflected in the video list interfaces 218, 226 of the iterations of the video messaging component in real-time as the changes are made. In embodiments, the server 230 is configured to ensure that updates to the collaborative video list of a video messaging component container are performed in the order they are performed by the users of the video messaging component.

Figure 3A:
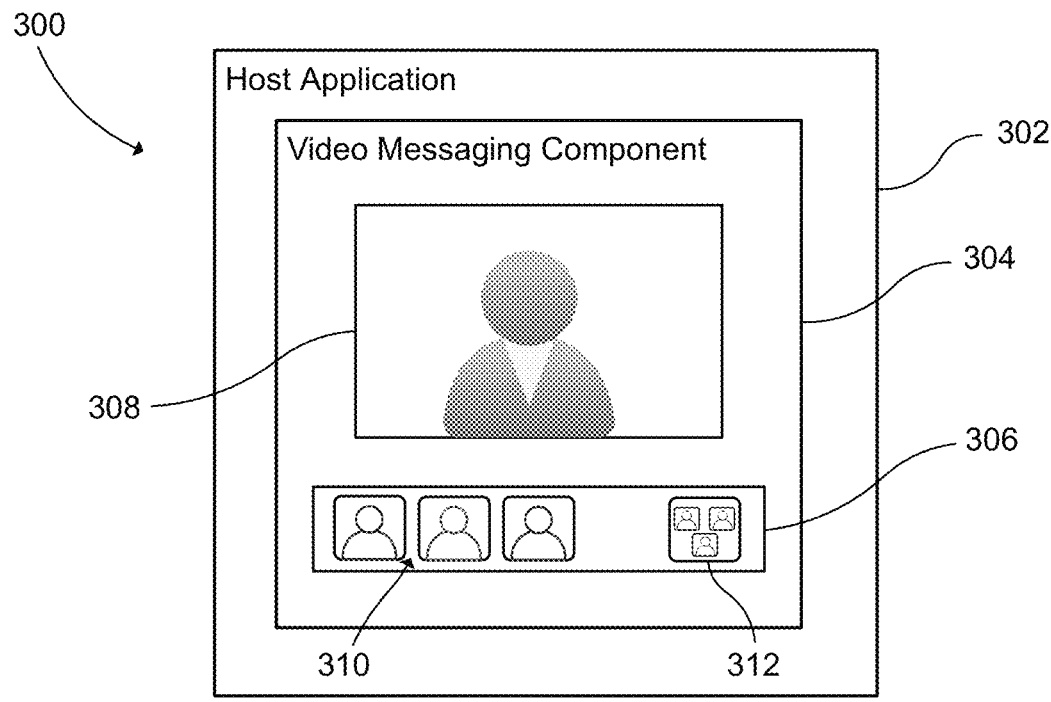
FIG. 3A depicts an example implementation of a video messaging component of the video messaging system of FIG. 2.
Figure 3B:
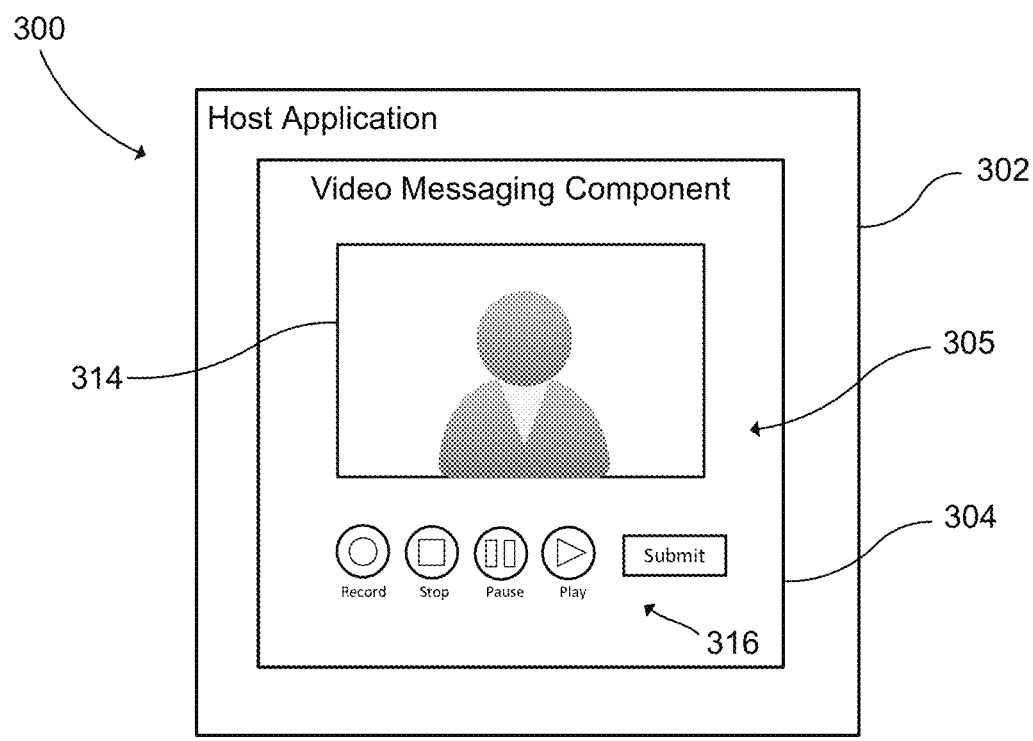
FIG. 3B shows the video generation interface of the video messaging component of FIG. 3A.

An example implementation 300 of a user interface for a video messaging component 304 is shown in FIGS. 3A and 3B. The video messaging component 304 is shown as being displayed inline in a host application 302. The video messaging component 304 includes a video display interface 308 and a video list interface 306. As shown in FIG. 3A, the video list interface 306 shows a thumbnail 310 for each video in the list. The thumbnail 310 may show an image of the user that generated the video, an image from the video, or another visual representation for signifying the video, such as an icon. In some embodiments, the video list interface 306 may show text information pertaining to the video (not shown), such as the name of the user, time/day the video was generated, length of the video, and the like. The video display interface 308 comprises a window, pane or frame in which the video content from the video display list 306 is played. A user input device, such as a mouse, keyboard, touch-screen display, and the like, can be used to select a video from the video list interface 306 which is then played in the video display interface 308.

In embodiments, the video messaging component 304 may be configured to display an indication 312 of the users that are currently generating, or recording, video content for the video messaging component 304. For example, in embodiments, video messaging clients 210, 212 may be configured to notify the video messaging server 230 when a user is generating a video on a client device 206, 208. The video messaging server 230 may then notify the video messaging clients 210, 212 on other client devices so that an indication 312 may be provided in the user interface of the video messaging component 304 that the user is generating a video. In the example of FIG. 3A, the video display list 306 may include a visual indicator 312 for identifying users that are currently generating a video. In embodiments, the visual indicator 312 may depict a thumbnail of the users, such as depicted in FIG. 3. In other embodiments, the visual indicator 312 may include names, and/or other identifying information pertaining to the users currently generating videos.

Referring to FIG. 3B, the video messaging component 304 also includes a video generation interface 305 that enables users to generate video content for the video messaging component. The video generation interface 305 may be displayed in response to interaction with a user interface element, such as a button, menu, or the like. The video generation interface 305 includes a video display area 314 in which video content captured by a video camera, recorded from a screen, and/or added from a video file may be viewed. The video generation interface 314 includes user interface elements 316 that enable video content to be recorded and submitted. In embodiments, the video generation interface may enable recording and playback of new video content to be started, stopped, paused, played, and submitted. In some embodiments, the video generation interface 305 may be configured to enable premade videos to be uploaded and submitted via the video messaging component.

Referring again to FIG. 2, when video content is generated by a user at a client device 206, 208, the video content is uploaded to the video messaging server 230 by the corresponding video messaging client 210, 212. The video messaging server 230 generates playback information and display information for the new video content. In embodiments, the playback information and display information may be returned to the video messaging client 210, 212, and the video messaging client 210, 212 may then access the video messaging component container 204 to add the playback information and display information for the new video content to the collaborative video list 236. In other embodiments, the video messaging server 230 may access the video messaging component container 204 to add the playback information and display information for the new video content to the collaborative video list 236. In either case, the video list interface 306 of the video messaging component on both client devices is updated in real-time as new video content is added to the collaborative video list 236.

Figure 4:
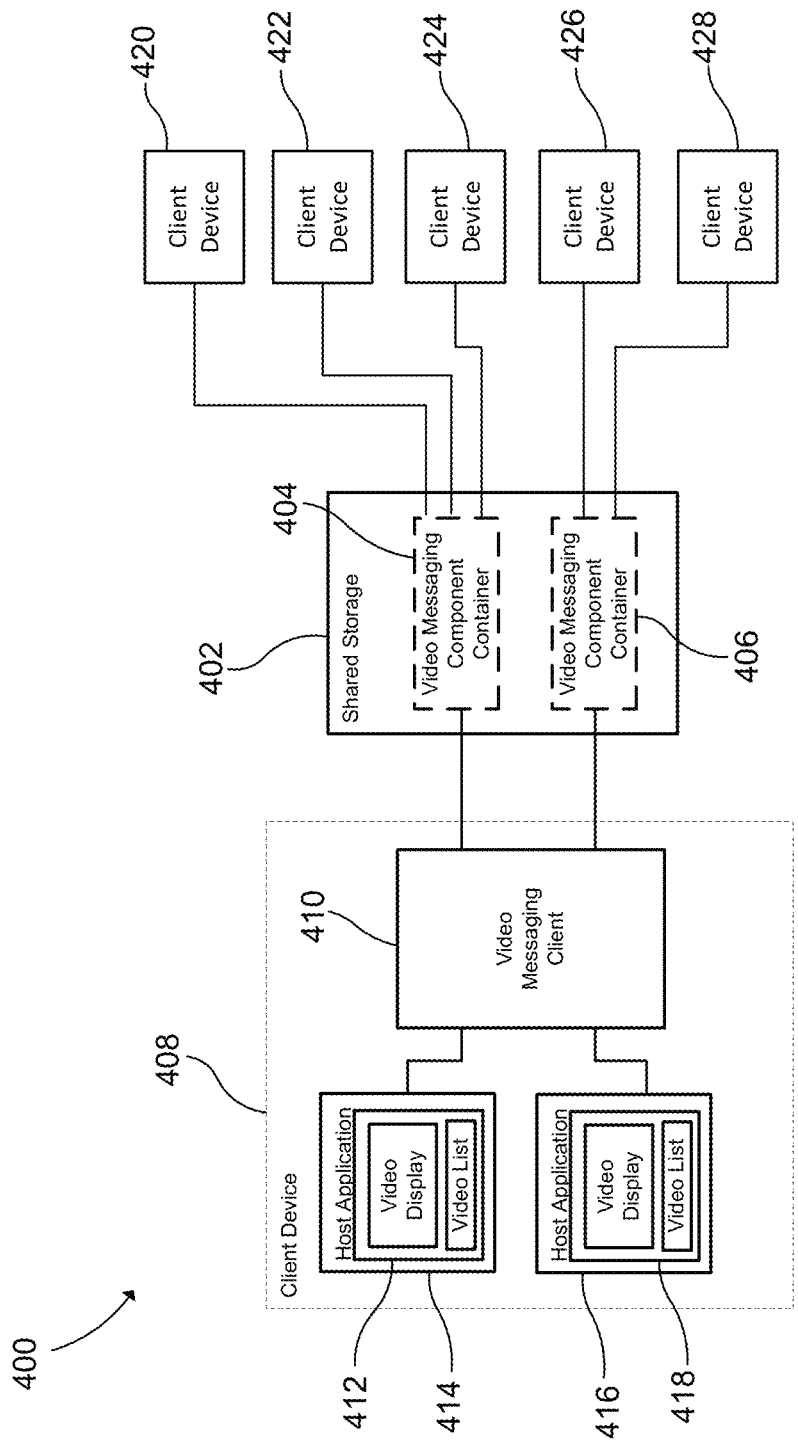
FIG. 4 shows an example implementation of a video messaging system having multiple video messaging component containers for generating different video messaging components.

FIG. 4 shows an implementation of a video messaging system 400 demonstrating how multiple video messaging component containers may be utilized to provide different video messaging conversations with different groups of users. The system 400 of FIG. 4 includes a data store 402 having a first video messaging component container 404 and a second messaging component container 406. Client devices 408, 420, 422, 424, 426, 428 have access to the data store 402. Client device 408 includes a video messaging client 410. Client devices 420, 422, 424, 426, 428 also include video messaging clients but these elements have been omitted from FIG. 4 for reasons of clarity. The video messaging client 410 of client device 408 has accessed both video messaging component containers 404, 406 and rendered an iteration 412 of the first video messaging component in a first host application 414 and rendered an iteration 418 of the second video messaging component in a second host application 416. Although the iterations 412, 418 of the respective video messaging components are shown in separate host applications 414, 416, in some embodiments, the iterations 412, 418 of both video messaging components may be rendered in the same host application.

The first video messaging component container 404 is also shared with users associated with client devices 420, 422, 424. Client devices 420, 422, 424 each include video messaging clients (not shown) that have access to the data store 402 and have rendered iterations (not shown) of the video messaging component defined by the first video messaging component container 404. The second video messaging component container 406 is shared with users associated with client devices 426, 428. Client devices 426, 428 include video messaging clients (not shown) that have access to the data store 402 and have rendered iterations (not shown) of the video messaging component defined by the second video messaging component container 406.

In the embodiment of FIG. 4, the users of the iterations of the video messaging component on client devices 420, 422, 424 and user of the iteration 412 of the video messaging component on client device 408 form a first video messaging group. The video content generated by these iterations is used to update the collaborative video list of only the first video messaging component container 404 so that the video content is only shared between users in the first messaging group. Similarly, the users of the iterations of the video messaging component on client devices 426, 428 and the user of the iteration 418 of the video messaging component on client device 408 form a second video messaging group. The video content generated by these iterations is used to update the collaborative video list of only the second video messaging component container 404 so that the video content is only shared between users in the second messaging group.

In this way, the video messaging system in accordance with this disclosure enable separate video messaging conversations to be had between different groups of users by simply utilizing different video messaging components for each conversation. Video messaging components may be hosted in applications and easily shared between users to make video messaging conversations convenient and efficient. Video messaging conversations may be had asynchronously between friends, friend groups, coworkers, work groups, and the like and for substantially any reason. As one example, a video messaging component may be used as a kind of video card for wishing someone a happy birthday. A group of friends may generate a collaborative video messaging component for a person's birthday with videos wishing the person a happy birthday. The video messaging component may then be emailed to the person so the person can view the videos in the email application and respond with a video if desired.

Figure 5:
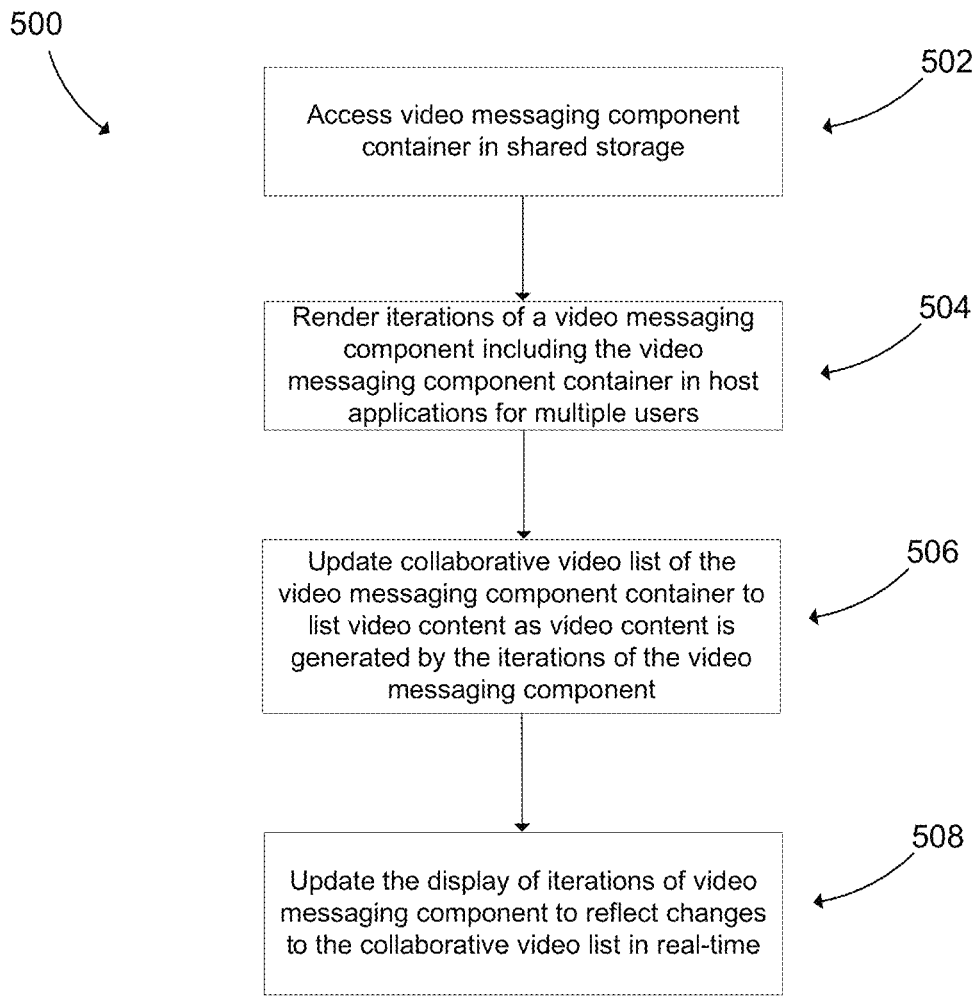
FIG. 5 depicts a flowchart of an example method for implementing a video messaging system.

An example method 500 of utilizing video messaging components for video messaging conversations is shown in FIG. 5. The method 500 begins with accessing a video messaging component container in a data store (block 502), e.g., using video messaging clients on client devices. Iterations of a video messaging component defined by the video messaging component container are then rendered in host applications on client devices for multiple users (block 504). As video content is generated by users of the iterations of the video messaging component, the collaborative video list of the video messaging component container is updated to include the video content as the video content is being generated (block 506). The video list interface of each iteration of the video messaging component is updated to reflect the changes to the collaborative video list in real-time (block 508).

Figure 6:
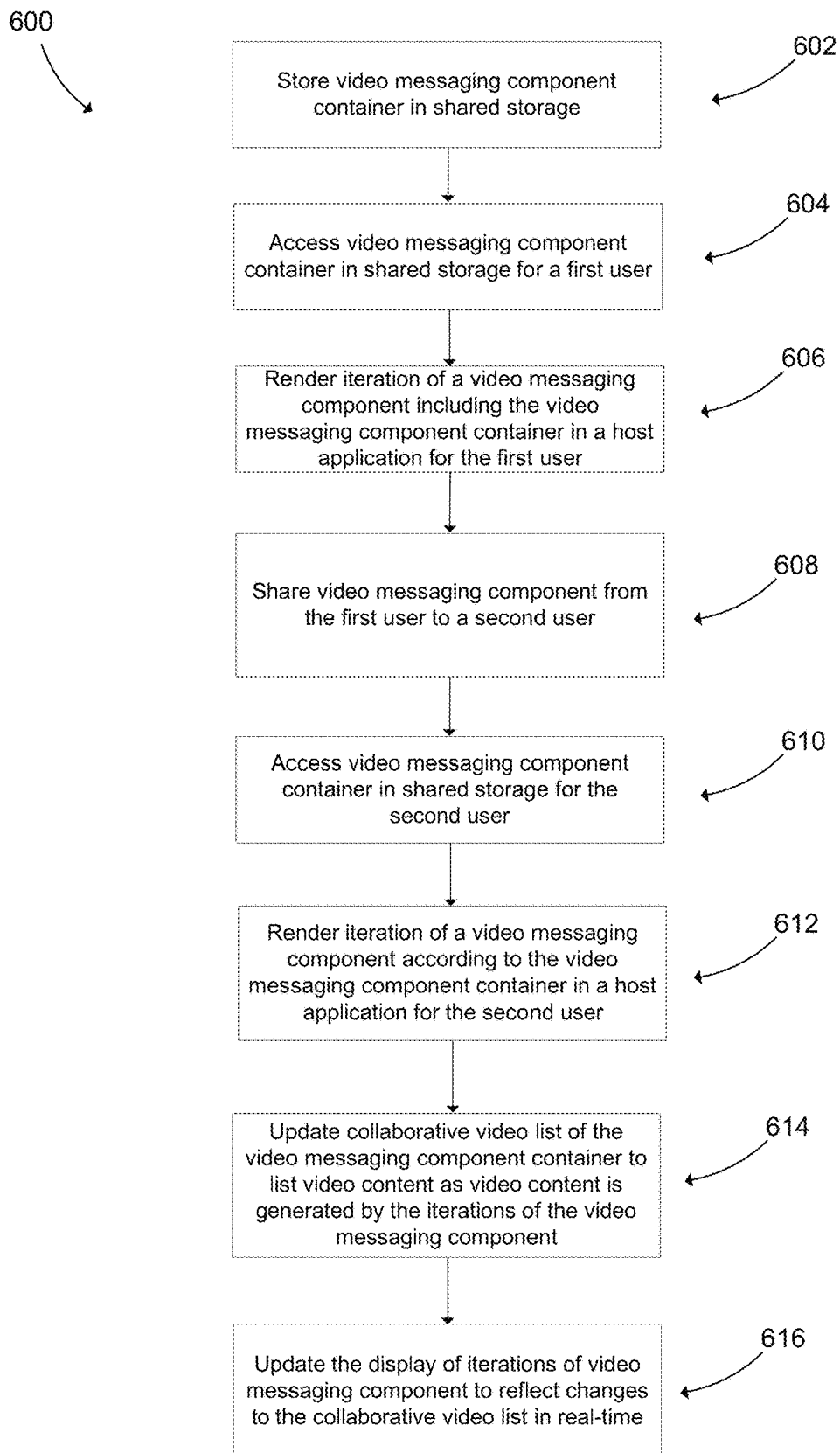
FIG. 6 depicts a flowchart of another example method for implementing a video messaging system.

Another example method 600 of utilizing video messaging components for video messaging conversations is shown in FIG. 6. The method 600 begins with storing a video messaging component container in data store (block 602). The video messaging component container is accessed by a first user (block 604), e.g., by a video messaging client on a client device associated with the first user. An iteration of the video messaging component defined by the video messaging component container is rendered in a host application for the first user (block 606). The video messaging component may then be shared from the first user to a second user (block 608), e.g., by including the video messaging component in a message for a messaging application, such as an email application, chat application, a meeting application, etc. The video messaging component container may then be accessed by the video messaging client on the client device associated with the second user (block 610), and an iteration of the video messaging component may be rendered in a host application for the second user (block 612).

As video content is generated by the first user and the second user of the iterations of the video messaging component, the collaborative video list of the video messaging component container is updated to include the video content as the video content is being generated (block 614). The video list interface of each iteration of the video messaging component is updated to reflect the changes to the collaborative video list in real-time (block 616).

Figure 7:
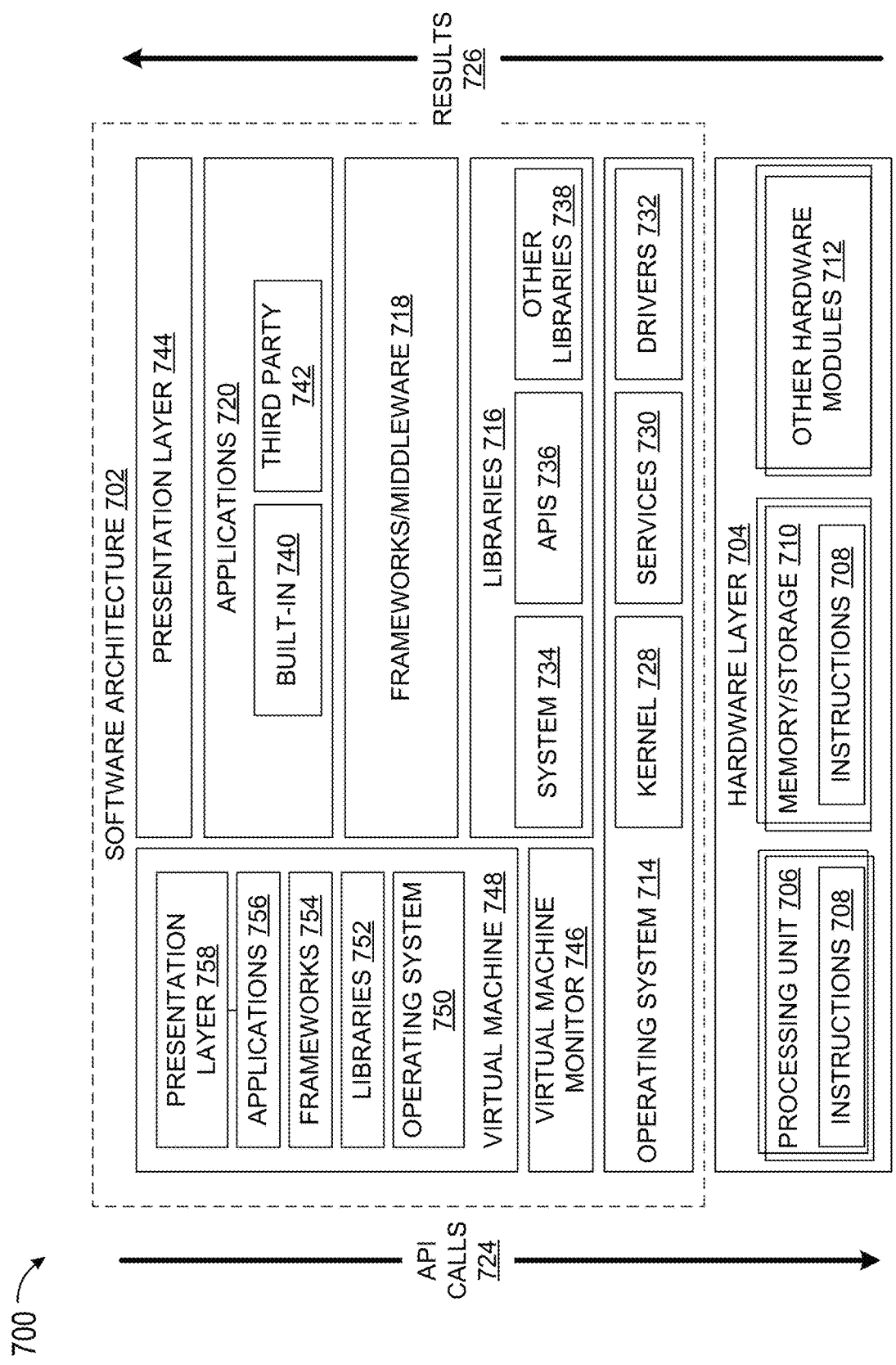
FIG. 7 is a block diagram illustrating an example software architecture, various portions of which may be used in conjunction with various hardware architectures herein described.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
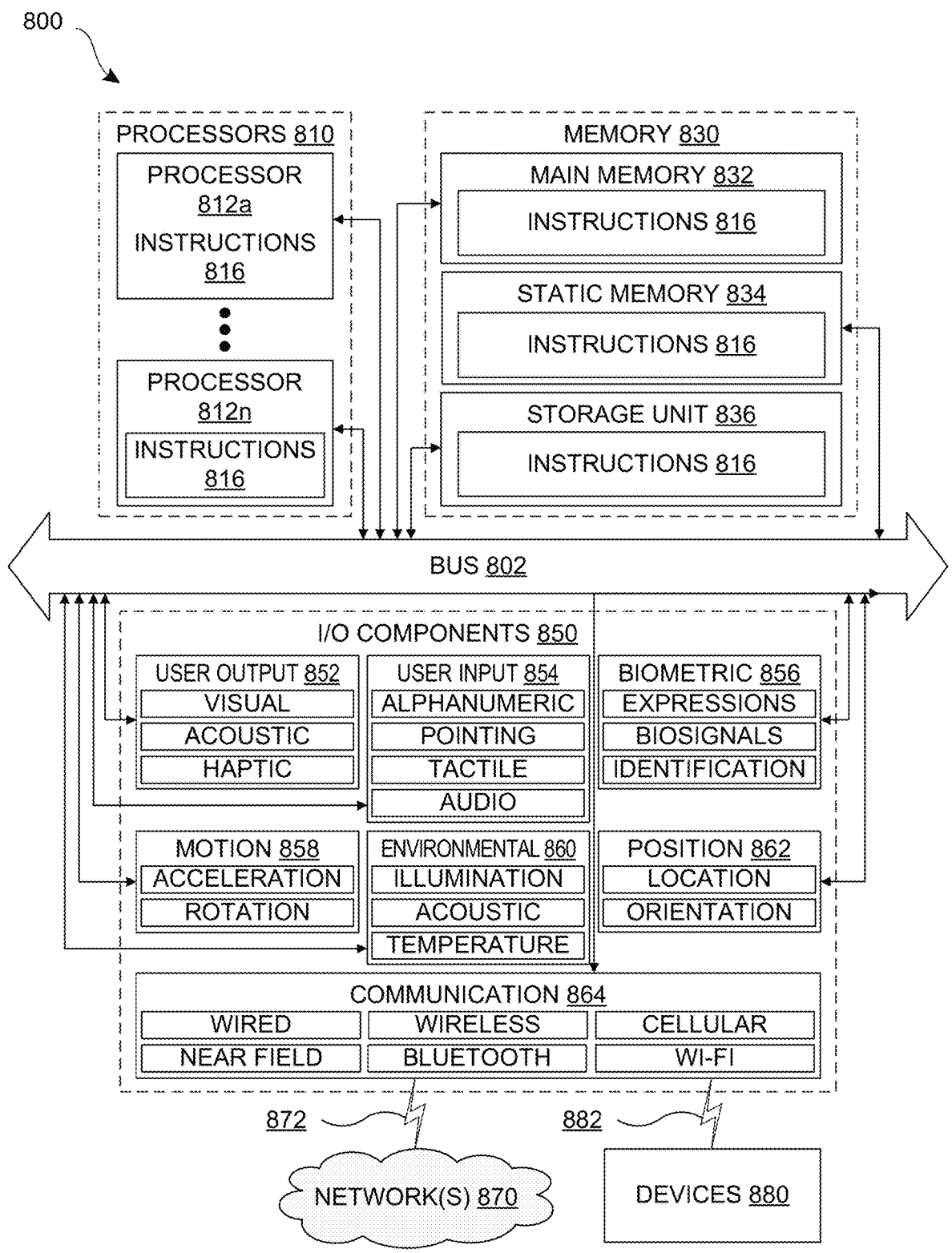
FIG. 8 is a block diagram illustrating components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IOT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

In the following, further features, characteristics and advantages of the invention will be described by means of items:

Item 1. A method for asynchronous video messaging, the method comprising:
  rendering iterations of a first video messaging component in host applications on client devices and linking the iterations to a first video messaging component file stored in a shared storage, the first video messaging component file including a collaborative video list for collecting and storing playback information and display information for video content generated by the iterations of the video messaging component, each of the iterations having a user interface, the user interface including (i) a video list interface for showing the display information for the video content, (ii) a video display interface for playing the video content based on the playback information, and (iii) a video generating interface for generating the video content for the collaborative video list;
  generating new video content for the first video messaging component via the video generating interface of one or more of the iterations of the video messaging component;
  storing new playback information and new display information for the new video content in the collaborative video list; and
  updating the video list interface of each of the iterations of the video messaging component to reflect changes to the collaborative video list of the first video messaging component file in real-time.

Item 2. The method of item 1, further comprising
  uploading the new video content to a video messaging service;
  receiving the new playback information and the display information for the new video content from the video messaging service, the playback information including instructions for playing the new video content and the display information including thumbnails for the new video content; and
  updating the collaborative video list to include the playback information and the display information for the new video content.

Item 3. The data processing system of any of items 1-2, wherein the new video content is stored in a data store of the video messaging service.

Item 4. The method of any of items 1-3, wherein each of the host applications comprises one of a meeting application, messaging application, emailing application, word processing application, spreadsheet application, and collaboration application.

Item 5. The method of any of items 1-4, wherein the iterations of the video messaging component are rendered by video messaging clients on the client devices.

Item 6. The method of any of items 1-5, wherein the video messaging clients are provided as add-ins or plug-ins to the host applications.

Item 7. The method of any of items 1-6, further comprising:
rendering a first iteration of the first video messaging component in a host application on a first client device and linking the first iteration to the first video messaging component file stored in the shared storage;
sharing the first video messaging component from the host application on the first client device to a host application on a second client device; and
rendering a second iteration of the first video messaging component in the host application on the second client device and linking the second iteration to the first video messaging component file stored in the shared storage.

Item 8. The method of any of items 1-7, wherein the first video messaging component is shared by including a link to the first video messaging component file in one of a message, an email, and a document.

Item 9. A data processing system comprising:
a processor; and
a memory in communication with the processor, the memory comprising executable instructions that, when executed by the processor, cause the data processing system to perform functions of:
rendering a first iteration of a first video messaging component in a first host application and linking the first iteration to a first video messaging component file stored in a shared storage, the first video messaging component file including a first collaborative video list for collecting and storing playback information for video content generated for the first video messaging component, the first iteration having a user interface, the user interface including (i) a video list interface for showing the video content in the first collaborative video list, (ii) a video display interface for playing the video content in the video list interface, and (iii) a video generating interface for generating new video content for the first video messaging component; and
updating the video list interface of the first iteration of the video messaging component to reflect changes to the first collaborative video list of the first video messaging component file in real-time.

Item 10. The data processing system of item 9, wherein the executable instructions, when executed by the processor, further cause the data processing system to perform functions of:
generating new video content via the video generating interface of the first iteration of the video messaging component; and
uploading the new video content to a video messaging service.

Item 11. The data processing system of any of items 9-10, wherein the executable instructions, when executed by the processor, further cause the data processing system to perform functions of:
receiving new playback information and new display information for the new video content from the video messaging service; and
updating the first collaborative video list to include the new playback information and the new display information for the new video content.

Item 12. The data processing system of any of items 9-11, wherein the host applications is one of a meeting application, messaging application, emailing application, word processing application, spreadsheet application, and collaboration application.

Item 13. The data processing system of any of items 9-12, wherein the first iteration of the first video messaging component is rendered in the host application by a video messaging client, the video messaging client being provided as an add-in or plug-in to the host application.

Item 14. The data processing system of any of items 9-13, wherein the executable instructions, when executed by the processor, further cause the data processing system to perform functions of:
receiving the link to the first video messaging component file in one of a message, an email and a document; and
rendering the first iteration based on the link.

Item 15. The data processing system of any of items 9-14, wherein the executable instructions, when executed by the processor, further cause the data processing system to perform functions of:
rendering a second iteration of the first video messaging component in the first host application or a second host application and linking the second iteration to the first video messaging component file; and
updating the video list interface of the second iteration of the first video messaging component to reflect changes to the collaborative video list of the first video messaging component file in real-time.

Item 16. The data processing system of any of items 9-15, wherein the executable instructions, when executed by the processor, further cause the data processing system to perform functions of:
rendering a first iteration of a second video messaging component in the first host application or a second host application and linking the first iteration of the second video messaging component to a second video messaging component file, the second video messaging component including a second collaborative video list; and
updating a video list interface of the first iteration of the second video messaging component to reflect changes to the second collaborative video list in real-time.

Item 17. A non-transitory computer readable medium on which are stored instructions that, when executed, cause a programmable device to perform functions of:
rendering a first iteration of a first video messaging component in a first host application and linking the first iteration to a first video messaging component file stored in a shared storage, the first video messaging component file including a first collaborative video list for collecting and storing playback information for video content generated for the first video messaging component, the first iteration having a user interface, the user interface including (i) a video list interface for showing the video content in the first collaborative video list, (ii) a video display interface for playing the video content in the video list interface, and (iii) a video generating interface for generating new video content for the first video messaging component; and
updating the video list interface of the first iteration of the video messaging component to reflect changes to the first collaborative video list of the first video messaging component file in real-time.

Item 18. The non-transitory computer readable medium of item 17, wherein the executable instructions, when executed by the processor, further cause the data processing system to perform functions of:
  receiving the link to the first video messaging component file in one of a message, an email and a document; and
  rendering the first iteration based on the link.

Item 19. The non-transitory computer readable medium of any of items 17-18, wherein the executable instructions, when executed by the processor, further cause the data processing system to perform functions of:
  rendering a second iteration of the first video messaging component in the first host application or a second host application and linking the second iteration to the first video messaging component file; and
  updating the video list interface of the second iteration of the first video messaging component to reflect changes to the collaborative video list of the first video messaging component file in real-time.

Item 20. The non-transitory computer readable medium of any of items 17-19, wherein the executable instructions, when executed by the processor, further cause the data processing system to perform functions of:
  rendering a first iteration of a second video messaging component in the first host application or a second host application and linking the first iteration of the second video messaging component to a second video messaging component file, the second video messaging component including a second collaborative video list; and
  updating a video list interface of the first iteration of the second video messaging component to reflect changes to the second collaborative video list in real-time.

While various embodiments have been described, the description is intended to be exemplary, rather than limiting, and it is understood that many more embodiments and implementations are possible that are within the scope of the embodiments. Although many possible combinations of features are shown in the accompanying FIGURES and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method for asynchronous video messaging, the method comprising:
  receiving requests to start new video messaging conversations from video messaging clients of host applications installed on client devices; and
  in response to receiving each request from a video messaging client:
    generating a new video messaging component container and storing the new video messaging component container in a data store, the new video messaging component container including a collaborative video list for collecting and storing playback information and displaying information for video content generated for each new video messaging conversation;

returning linking parameters for the new video messaging component container to the video messaging client, the linking parameters being sharable and enabling the video messaging clients to access and update the new video messaging component container and the collaborative video list; and providing instructions to the video messaging client which enable the video messaging client to:

render iterations of a video messaging component in the host applications installed on the client devices and linking the iterations to the new video messaging component container, each of the iterations having a user interface, the user interface including (i) a video list interface for showing the display information for the video content, (ii) a video display interface for playing the video content based on the playback information, and (iii) a video generating interface for generating the video content for the collaborative video list;

generate new video content via the video generating interface of one or more of the iterations of the video messaging component linked to the new video messaging component container;

store new playback information and new display information for the new video content in the collaborative video list; and update the video list interface of each of the iterations of the video messaging component linked to the new video messaging component container to reflect changes to the collaborative video list of the new video messaging component container in real-time.

2. The method of claim 1, further comprising:

uploading the new video content to a video messaging service;

receiving the new playback information and the new display information for the new video content from the video messaging service, the playback information including instructions for playing the new video content and the new display information including thumbnails for the new video content; and updating the collaborative video list to include the playback information and the new display information for the new video content.

3. The method of claim 2, wherein the new video content is stored in the data store of the video messaging service.

4. The method of claim 1, wherein each of the host applications comprises one of a meeting application, messaging application, emailing application, word processing application, spreadsheet application, and collaboration application.

5. The method of claim 1, wherein the video messaging clients are provided as add-ins or plug-ins to the host applications.

6. A data processing system comprising:

a processor; and a memory in communication with the processor, the memory comprising executable instructions that, when executed by the processor, cause the data processing system to perform functions of:

receiving requests to start new video messaging conversations from video messaging clients of host applications installed on client devices; and in response to receiving each request from a video messaging client:

generating a new video messaging component container and storing the new video messaging component container in a data store, the new video messaging component container including a collaborative video list for collecting and storing playback information and displaying information for video content generated for each new video messaging conversation;

returning linking parameters for the new video messaging component container to the video messaging client, the linking parameters being sharable and enabling the video messaging clients to access and update the new video messaging component container and the collaborative video list; and providing instructions to the video messaging client which enable the video messaging client to:

render iterations of a video messaging component in the host applications installed on the client devices and linking the iterations to the new video messaging component container, each of the iterations having a user interface, the user interface including (i) a video list interface for showing the display information for the video content, (ii) a video display interface for playing the video content based on the playback information, and (iii) a video generating interface for generating the video content for the collaborative video list;

generate new video content via the video generating interface of one or more of the iterations of the video messaging component linked to the new video messaging component container;

store new playback information and new display information for the new video content in the collaborative video list; and update the video list interface of each of the iterations of the video messaging component linked to the new video messaging component container to reflect changes to the collaborative video list of the new video messaging component container in real-time.

7. The data processing system of claim 6, wherein the executable instructions, when executed by the processor, further cause the data processing system to perform functions of:

uploading the new video content to a video messaging service.

8. The data processing system of claim 7, wherein the executable instructions, when executed by the processor, further cause the data processing system to perform functions of:

receiving the new playback information and the new display information for the new video content from the video messaging service; and updating the collaborative video list to include the new playback information and the new display information for the new video content.

9. The data processing system of claim 6, wherein each of the host applications is one of a meeting application, messaging application, emailing application, word processing application, spreadsheet application, and collaboration application.

10. A non-transitory computer readable medium on which are stored instructions that, when executed, cause a programmable device to perform functions of:

receiving requests to start new video messaging conversations from video messaging clients of host applications installed on client devices; and in response to receiving each request from a video messaging client:
  generating a new video messaging component container and storing the new video messaging component container in a data store, the new video messaging component container including a collaborative video list for collecting and storing playback information and displaying information for video content generated for each new video messaging conversation;
  returning linking parameters for the new video messaging component container to the video messaging client, the linking parameters being sharable and enabling the video messaging clients to access and update the new video messaging component container and the collaborative video list; and
  providing instructions to the video messaging client which enable the video messaging client to:
    render iterations of a video messaging component in the host applications installed on the client devices and linking the iterations to the new video messaging component container, each of the iterations having a user interface, the user interface including (i) a video list interface for showing display information for the video content, (ii) a video display interface for playing the video content based on the playback information, and (iii) a video generating interface for generating the video content for the collaborative video list;
    generate new video content via the video generating interface of one or more of the iterations of the video messaging component linked to the new video messaging component container;
    store new playback information and new display information for the new video content in the collaborative video list; and
    update the video list interface of each of the iterations of the video messaging component linked to the new video messaging component container to reflect changes to the collaborative video list of the new video messaging component container in real-time.

* * * * *